(12) United States Patent
Stanek

(10) Patent No.: US 12,107,481 B2
(45) Date of Patent: Oct. 1, 2024

(54) SYSTEM INCLUDING AN ELECTRIC MOTOR AND TRANSMISSION OF SENSOR DATA

(71) Applicant: SEW-EURODRIVE GMBH & CO. KG, Bruchsal (DE)

(72) Inventor: Klaus Stanek, Forst (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 302 days.

(21) Appl. No.: 17/777,308

(22) PCT Filed: Oct. 28, 2020

(86) PCT No.: PCT/EP2020/025480
§ 371 (c)(1),
(2) Date: May 17, 2022

(87) PCT Pub. No.: WO2021/104662
PCT Pub. Date: Jun. 3, 2021

(65) Prior Publication Data
US 2022/0407382 A1    Dec. 22, 2022

(30) Foreign Application Priority Data
Nov. 25, 2019   (DE) .......................... 102019008147.1

(51) Int. Cl.
*E05F 15/622*    (2015.01)
*H02K 5/22*    (2006.01)
(Continued)

(52) U.S. Cl.
CPC ............. *H02K 5/225* (2013.01); *H02K 11/35* (2016.01); *H02K 3/28* (2013.01)

(58) Field of Classification Search
CPC ......... H02K 11/35; H02K 7/145; B60J 5/047; E05F 15/622
See application file for complete search history.

(56) References Cited

U.S. PATENT DOCUMENTS

2018/0347252 A1* 12/2018  Zeabari ................. E05F 15/622
2019/0321961 A1* 10/2019  Palich .................... H02K 7/145
2023/0028141 A1*  1/2023  Ong ........................ G01C 19/02

FOREIGN PATENT DOCUMENTS

DE          19957064 A1    6/2001
DE       102007052445 A1    6/2008
(Continued)

OTHER PUBLICATIONS

International Report on Patentability issued in corresponding International Application No. PCT/EP2020/025480 dated May 17, 2022, pp. 1-9, English Translation.
(Continued)

*Primary Examiner* — Cortez M Cook
(74) *Attorney, Agent, or Firm* — Carter, DeLuca & Farrell LLP

(57) ABSTRACT

A system includes an electric motor having a terminal box into which a three-phase power cable is guided and in which the stator winding, e.g., the wire ends of the winding wire of the stator winding, of the electric motor is electrically connected to electrical lines of the three-phase power cable. A data collector is arranged in the terminal box of the electric motor, which has a data store and which is electrically connected to at least one sensor arranged in and/or on the electric motor, and the data collector has an electronic circuit for the modulation and demodulation of voltage portions.

20 Claims, 1 Drawing Sheet

(51) Int. Cl.
    *H02K 11/35*    (2016.01)
    *H02K 3/28*     (2006.01)

(56) References Cited

FOREIGN PATENT DOCUMENTS

| DE | 102008045476 A1 | 4/2009 |
| DE | 102013007649 A1 | 11/2014 |
| DE | 102016113028 A1 | 1/2018 |
| WO | 2009109245 A1 | 9/2009 |
| WO | 2012113496 A2 | 8/2012 |

OTHER PUBLICATIONS

International Search Report issued in corresponding International Application No. PCT/EP2020/025480 dated Feb. 5, 2021, pp. 1-2, English Translation.
Ferraris-Beschleunigungssensor, "Robust acceleration sensor based on the Ferraris principle for linear and rotative drives" ACC 93 . ACC 94 Ferraris Acceleraion Sensor, XP055467154 (Mar. 2007) pp. 1-4.

* cited by examiner

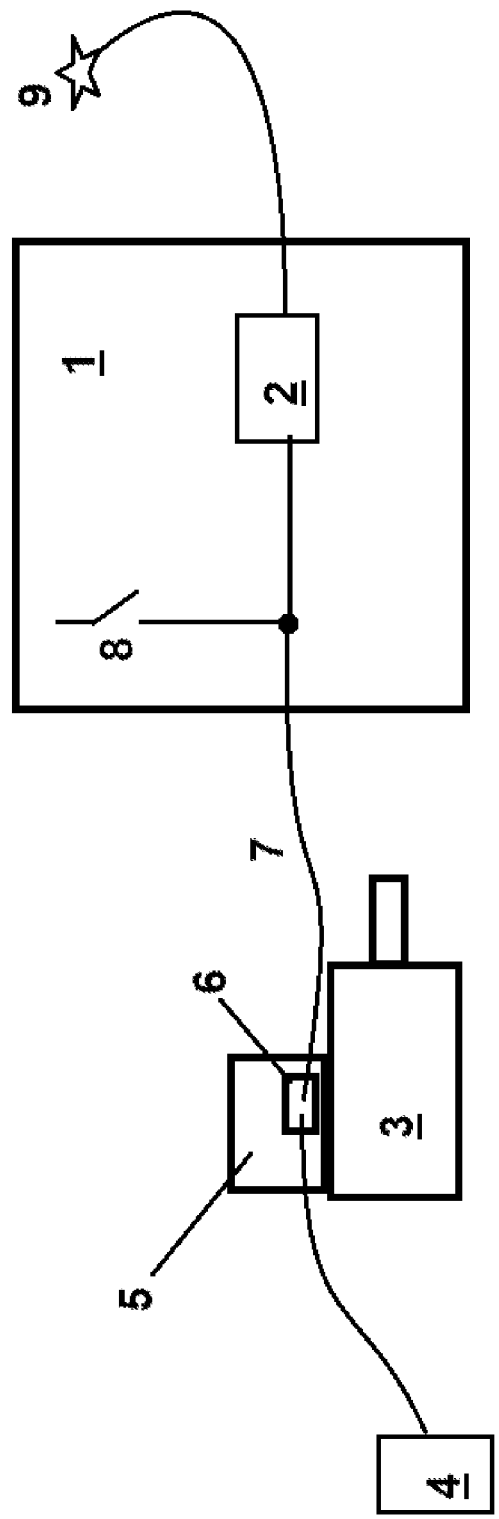

SYSTEM INCLUDING AN ELECTRIC MOTOR AND TRANSMISSION OF SENSOR DATA

FIELD OF THE INVENTION

The present invention relates to a system, e.g., equipment, that includes an electric motor.

BACKGROUND INFORMATION

In certain conventional systems, an electric motor arranged as a three-phase motor can be supplied via a three-phase power cable.

A cover for a motor terminal box is described in German Patent Document No. 199 57 064.

A system for monitoring energy consumption in industrial plants is described in German Patent Document No. 10 2016 113 028.

A motor system with sensor and evaluation unit is described in PCT Patent Document No. WO 2009/109245.

A drive unit is described in German Patent Document No. 10 2008 045 476.

An arrangement for determining the angular position of a shaft is described in PCT Patent Document No WO 2012/113496.

SUMMARY

Example embodiments of the present invention provide a three-phase motor that is readily operated with increased safety.

According to an example embodiment of the present invention, a system, e.g., equipment, includes an electric motor having a terminal box into which a three-phase power cable is guided and in which the stator winding, the wire ends of the winding wire of the stator winding, of the electric motor is electrically connected to electrical lines of the three-phase power cable. A data collector is arranged in the terminal box of the electric motor, which has a data store and which is electrically connected to at least one sensor arranged in and/or on the electric motor, and the data collector includes an electronic circuit for modulation and demodulation of voltage portions.

Data recorded in, on, or at the electric motor can be modulated and evaluated and/or monitored by a computer connected via the Internet to the signal electronics located in the switch cabinet. Thus, the electric motor does not need a powerful computer, but it is resorted to a computer connected via the Internet.

Thus, no separate supply line to the motor is necessary, only low costs for installation and/or maintenance are incurred, simple installation is possible, high system availability is achievable, the probability and/or number of defects and/or failures is reduced, and/or availability of operating data is achievable.

According to example embodiments, values of a physical quantity detected by the sensor can be stored in the data store and transmitted via the electrical lines of the three-phase power cable by the modulation. The advantage is that no separate additional lines are required to transmit the recorded values of the physical variables to a powerful computer, which evaluates and monitors the data using computationally intensive operations.

According to example embodiments, values of a physical quantity detected by the sensor can be stored in the data store and transmitted via the electrical lines of the three-phase power cable by the modulation to signal electronics arranged in a switch cabinet, which also has an electronic circuit for modulation and demodulation of voltage portions. The advantage is that contactless data transmission is possible and thus condition monitoring can be carried out in a simple manner.

According to example embodiments, the signal electronics arranged in the switch cabinet include an inverter arranged in the switch cabinet and fed from an AC supply network, and the signal electronics generate pulse-width modulated drive signals for controllable semiconductor switches of the inverter. For example, the converter supplies the electric motor with a three-phase current by the three-phase power cable, and the frequency of the three-phase current is smaller than the frequency of the voltage portions, e.g., smaller than 1 kHz. The signal electronics of an inverter can be used to additionally operate condition monitoring, and the recorded values are first stored in the data store of the data collector and then the evaluation of the data is carried out.

According to example embodiments, the modulation and demodulation of voltage portions takes place in one or more first time periods, and the electric motor is not supplied in the one or more first time periods and the data collector is supplied from an energy storage of the data collector. The inverter supplies the electric motor with the three-phase current in one or more second time periods, and the first time period or periods do not overlap with the second time period or periods. The sources of interference can be reduced in the first time periods, since no motor current is present.

According to example embodiments, the modulation and demodulation of voltage portions takes place in the range of one or more zero crossings of a motor phase current. There is no interference source at least on the motor phase feed line used for modulating the voltage portions.

According to example embodiments, the frequency of the voltage portions is higher than the frequency of the three-phase current transmitted by the three-phase power cable and/or higher than 1 kHz. Data can be transmitted on the same electrical line as the power is supplied.

According to example embodiments, the electric motor is supplied directly from the AC supply network by the three-phase power cable, and a switch, e.g., a line contactor, is arranged between the three-phase power cable and the AC supply network. The signal electronics arranged in the switch cabinet modulate voltage portions onto the electrical lines or demodulate them from the electrical lines by the electronic circuit for modulating and demodulating voltage portions and are connected via a network, e.g., the Internet, to a computer for data exchange. For example, the computer is adapted for evaluating the data stored in the data store. An electric motor fed directly from the supply network, i.e., not speed-controllable but operated at constant speed, can be equipped with a condition monitoring system, and, for example, can be monitored.

According to example embodiments, the frequency of the voltage portions is greater than the frequency of the three-phase current provided by the AC supply network. Thus, interference is avoided, since a sufficiently large band gap can be obtained.

According to example embodiments, the terminal box is formed integrally, i.e., in one piece, with a housing part of the electric motor or is detachably connected. The data collector can be arranged in a protected manner.

According to example embodiments, a further sensor, arranged outside the electric motor and the terminal box, is connected to the data collector. Thus, other physical variables can be monitored.

According to example embodiments, in the data store of the data collector, the value of the temperature detected by a sensor placed in the stator winding, the value of the mains frequency of the AC supply network, e.g., which is detected by a sensor for voltage detection arranged in the data collector, and/or a value representing the hours of operation, e.g., which is detected by a time determining device which determines the duration of the non-vanishing motor voltage provided via the three-phase power cable, is stored. Thus, operating data can be collected and evaluated, e.g., that it can be monitored for the exceeding of a respective threshold value. Thus, if the voltage of the AC supply network provided via the three-phase power cable exceeds a threshold value, an overvoltage can be detected and thus a warning can be displayed, forwarded, or issued, e.g., by the computer connected via the network.

According to example embodiments, the further sensor is an accelerometer. Thus, it is readily possible to monitor for impermissibly high axial accelerations occurring on the rotor shaft.

Further features and aspects of example embodiments of the present invention are explained in more detail below with reference to the appended schematic FIGURE.

BRIEF DESCRIPTION OF THE DRAWING

FIG. 1 schematically illustrates a system according to an example embodiment of the present invention.

DETAILED DESCRIPTION

As schematically illustrated in FIG. 1, an electric motor 3 has a terminal box, e.g., a clamping box, to which a three-phase power cable 7 is guided which is electrically connected to the stator winding inside the terminal box.

The electric motor 3 is arranged as a three-phase motor, in which, for example, the stator winding is arranged as a three-phase winding.

In addition, sensors 4, which are arranged outside the electric motor 3 and its terminal box 5, are connected by a respective cable to a data collector 6, which is arranged inside the terminal box 5.

The data collector 6 is arranged as first signal electronics, which has a data store and an electronic circuit for modulating and demodulating voltage portions whose frequency is higher than the frequency of the three-phase voltage provided by the public supply network via a switch 8, e.g., a contactor, and the three-phase power cable 7.

Thus, data is transmitted by modulation from the data collector 6 via the three-phase power cable 7 to signal electronics 2 arranged in the switch cabinet in which the switch 8 is also arranged.

The signal electronics 2 also includes electronic circuitry for modulation and demodulation of the higher frequency voltage portions and further includes an interface connected to the Internet.

Inside the electric motor 3, e.g., inside the stator winding, however, there is also another sensor which detects temperature and is connected to the data collector by an electrical line. In addition, other sensors arranged in the electric motor 3 can also be connected to the data collector 6. In this manner, a torque value and/or a lateral force value and/or a speed and/or an angular position of the rotor shaft of the electric motor 3 can also be detected and their values can be fed to the data collector 6.

An evaluation of the sensor signals can also be carried out in the data collector 6. For example, no computationally intensive analysis can be performed by the data collector 6, since it does not include a powerful computer. However, simple operations are executable, such as averaging, formation of a moving average, low-pass filtering and/or formation of differences and/or formation of a difference quotient. For example, a current angular velocity can be determined from the detected values of the angular position and this can then be transmitted by modulation to the signal electronics 2 of the switch cabinet or via the signal electronics 2 to the Internet 9, i.e., to a server of the Internet.

Thus, a simple electric motor 3, which is fed directly from the public supply network, e.g., therefore not from an inverter or converter, can be equipped with condition monitoring, in which a more extensive evaluation or at least substantial parts of the evaluation and/or monitoring of the data can be carried out in a server of the Internet or a computer connected therewith.

Thus, the computationally complex evaluation of the physical quantities recorded by the sensor(s) can be performed in a simple manner on a powerful computer.

However, the data collector 6 is also electrically supplied from the three-phase power cable 7. Thus, no separate supply line is required for the data collector 6.

For example, the data collector 6 has a winding inductively coupled to at least one electrical line of the three-phase power cable 7, in which the voltage induced at the winding by the electrical line is fed, on the one hand, to a low-pass filter and/or rectifier for generating a DC voltage which supplies the data collector 6 and, on the other hand, to a bandpass filter or high-pass filter, whose characteristic frequency is above ten times the frequency of the public AC network, for coupling out a voltage component modulated onto the electrical line.

In this manner, the data collector 6 can be supplied with an electrical DC voltage and the data reception can be carried out, for example, above 1 kHz and demodulated by the three-phase power cable 7.

Likewise, data is modulated via the winding, in which the data can be received by the signal electronics 2 and can also be transmitted from the same to a server of the Internet 9.

Alternatively, instead of the galvanic isolation between, a galvanic direct supply to the data collector 6 is also possible by supplying the data collector 6 directly from the electrical lines of the three-phase power cable 7, which are arranged in a terminal board and to which the stator winding of the electric motor 3 is also connected.

According to example embodiments, the motor 3 is not supplied directly via the three-phase power cable 7 from the public AC supply network, but via a converter which is supplied from the public AC supply network. In this context, the signal electronics 2 may, for example, act as signal electronics of the inverter and generate pulse-width modulated drive signals for controllable semiconductor switches of the inverter, in which the signal electronics 2 further is connected to an Internet server.

This means that the recorded values of physical variables, such as temperature and/or torque, can be taken into account directly.

For example, the voltage portions are not modulated onto the three-phase power cable 7 at the same time as the power supply to the electric motor 3, but separately in time.

LIST OF REFERENCE NUMERALS

1 Switch cabinet
2 Signal electronics
3 Electric motor
4 External sensors
5 Terminal box
6 Data collector
7 Three-phase power cable
8 Switch
9 Internet
10 Temperature sensor

The invention claimed is:

1. A system, comprising:
an electric motor having a terminal box into which a three-phase power cable is arranged and in which a stator winding and/or wire ends of a winding wire of the stator winding of the electric motor is electrically connected to electrical lines of the three-phase power cable;
wherein a data collector is arranged in the terminal box of the electric motor, includes a data storer, and is electrically connected to at least one sensor arranged in and/or on the electric motor;
wherein the data collector includes an electronic circuit adapted to modulate and demodulate voltage portions;
wherein the data storer is adapted to store values of a physical quantity detected by the sensor, which are transmittable via the electrical lines of the three-phase power cable by the modulation to a signal electronics arranged in a switch cabinet and having an electronic circuit adapted to modulate and demodulate further voltage portions; and
wherein the signal electronics arranged in the switch cabinet includes an inverter arranged in the switch cabinet and adapted to be fed from an AC supply network, the signal electronics being adapted to generate pulse-width modulated drive signals for controllable semiconductor switches of the inverter.

2. The system according to claim 1, wherein the data storer is adapted to store values of a physical quantity detected by the sensor, which are transmittable via the electrical lines of the three-phase power cable by the modulation.

3. The system according to claim 1, wherein the converter is adapted to supply the electric motor with a three-phase current by the three-phase power cable, a frequency of the three-phase current being smaller than a frequency of the voltage portions.

4. The system according to claim 3, wherein a frequency of the three-phase current is smaller than 1 kHz.

5. The system according to claim 1, wherein the modulation and demodulation of the voltage portions occurs in one or more first time periods, and the electric motor is not supplied in the first time period or periods and the data collector is supplied from an energy storage of the data collector, the inverter adapted to supply the electric motor with the three-phase current in one or more second time periods, the first time period or periods not overlapping with the second time period or periods.

6. The system according to claim 1, wherein the terminal box is arranged integrally and/or in one piece with a housing part of the electric motor and/or is detachably connected to the hosing part of the electric motor.

7. The system according to claim 1, wherein another sensor, located outside the electric motor and the terminal box, is connected to the data collector.

8. The system according to claim 1, wherein the data storer of the data collector is adapted to store: (a) a value of a temperature detected by a sensor arranged in the stator winding; (b) a value of a power frequency of an AC supply network; (c) a number of revolutions of a rotor shaft; and/or (d) a value representing hours of operation.

9. The system according to claim 7, wherein the other sensor includes an accelerometer.

10. A system, comprising:
an electric motor having a terminal box into which a three-phase power cable is arranged and in which a stator winding and/or wire ends of a winding wire of the stator winding of the electric motor is electrically connected to electrical lines of the three-phase power cable;
wherein a data collector is arranged in the terminal box of the electric motor includes a data storer, and is electrically connected to at least one sensor arranged in and/or on the electric motor;
wherein the data collector includes an electronic circuit adapted to modulate and demodulate voltage portions; and
wherein the modulation and demodulation of the voltage portions takes place in the range of one or more zero crossings of a motor phase current.

11. The system according to claim 10, wherein the data storer is adapted to store values of a physical quantity detected by the sensor, which are transmittable via the electrical lines of the three-phase power cable by the modulation to a signal electronics arranged in a switch cabinet has an electronic circuit adapted to modulate and demodulate further voltage portions.

12. A system, comprising:
an electric motor having a terminal box into which a three-phase power cable is arranged and in which a stator winding and/or wire ends of a winding wire of the stator winding of the electric motor is electrically connected to electrical lines of the three-phase power cable;
wherein a data collector is arranged in the terminal box of the electric motor, includes a data storer, and is electrically connected to at least one sensor arranged in and/or on the electric motor;
wherein the data collector includes an electronic circuit adapted to modulate and demodulate voltage portions; and
wherein a frequency of the voltage portions is higher than a frequency of the three-phase current transmitted by the three-phase power cable and/or is higher than 1 kHz.

13. A system, comprising:
an electric motor having a terminal box into which a three-phase power cable is arranged and in which a stator winding and/or wire ends of a winding wire of the stator winding of the electric motor is electrically connected to electrical lines of the three-phase power cable;
wherein a data collector is arranged in the terminal box of the electric motor, includes a data storer, and is electrically connected to at least one sensor arranged in and/or on the electric motor;
wherein the data collector includes an electronic circuit adapted to modulate and demodulate voltage portions;
wherein the data storer is adapted to store values of a physical quantity detected by the sensor, which are transmittable via the electrical lines of the three-phase power cable by the modulation to a signal electronics arranged in a switch cabinet and having an electronic circuit adapted to modulate and demodulate further voltage portions;

wherein the electric motor is adapted to be supplied directly from an AC supply network by the three-phase power cable, and a switch and/or a line contactor is arranged between the three-phase power cable and the AC supply network; and wherein the signal electronics arranged in the switch cabinet is adapted to modulate voltage portions onto the electrical lines or demodulate them from the electrical lines by the electronic circuit to modulate and demodulate voltage portions and are connected via a network and/or the Internet to a computer for data exchange.

14. The system according to claim 13, wherein the computer adapted to evaluate data stored in the data store.

15. The system according to claim 13, wherein a frequency of the modulated or demodulated voltage portions is greater than a frequency of the three-phase current provided by the AC supply network.

16. A system, comprising:

an electric motor having a terminal box into which a three-phase power cable is arranged and in which a stator winding and/or wire ends of a winding wire of the stator winding of the electric motor is electrically connected to electrical lines of the three-phase power cable;

wherein a data collector is arranged in the terminal box of the electric motor, includes a data storer, and is electrically connected to at least one sensor arranged in and/or on the electric motor;

wherein the data collector includes an electronic circuit adapted to modulate and demodulate voltage portions;

wherein the data storer of the data collector is adapted to store: (a) a value of a temperature detected by a sensor arranged in the stator winding; (b) a value of a power frequency of an AC supply network; (c) a number of revolutions of a rotor shaft; and/or (d) a value representing hours of operation; and wherein the value of the power frequency of the AC supply network is detected by a voltage detection sensor arranged in the data collector.

17. A system, comprising:

an electric motor having a terminal box into which a three-phase power cable is arranged and in which a stator winding and/or wire ends of a winding wire of the stator winding of the electric motor is electrically connected to electrical lines of the three-phase power cable;

wherein a data collector is arranged in the terminal box of the electric motor, includes a data storer, and is electrically connected to at least one sensor arranged in and/or on the electric motor;

wherein the data collector includes an electronic circuit adapted to modulate and demodulate voltage portions;

wherein the data storer of the data collector is adapted to store: (a) a value of a temperature detected by a sensor arranged in the stator winding; (b) a value of a power frequency of an AC supply network; (c) a number of revolutions of a rotor shaft; and/or (d) a value representing hours of operation; and wherein the value representing the hours of operation is detected by a time determination device adapted to determine a duration of a non-vanishing motor voltage provided via the three-phase power cable.

18. A system, comprising:

an electric motor having a terminal box into which a three-phase power cable is arranged and in which a stator winding and/or wire ends of a winding wire of the stator winding of the electric motor is electrically connected to electrical lines of the three-phase power cable;

wherein a data collector is arranged in the terminal box of the electric motor, includes a data storer, and is electrically connected to at least one sensor arranged in and/or on the electric motor;

wherein the data collector includes an electronic circuit adapted to modulate and demodulate voltage portions;

wherein the data storer of the data collector is adapted to store: (a) a value of a temperature detected by a sensor arranged in the stator winding; (b) a value of a power frequency of an AC supply network; (c) a number of revolutions of a rotor shaft; and/or (d) a value representing hours of operation; and wherein the number of revolutions of the rotor shaft and/or a number of regulation of the rotor shaft since a beginning of operation of the electric motor is determined by evaluating a signal of a sensor that detects the number of periods of the voltage supplying the electric motor.

19. A system, comprising:

an electric motor having a terminal box into which a three-phase power cable is arranged and in which a stator winding and/or wire ends of a winding wire of the stator winding of the electric motor is electrically connected to electrical lines of the three-phase power cable;

wherein a data collector is arranged in the terminal box of the electric motor, includes a data storer, and is electrically connected to at least one sensor arranged in and/or on the electric motor;

wherein the data collector includes an electronic circuit adapted to modulate and demodulate voltage portions;

wherein the data storer of the data collector is adapted to store: (a) a value of a temperature detected by a sensor arranged in the stator winding; (b) a value of a power frequency of an AC supply network; (c) a number of revolutions of a rotor shaft; and/or (d) a value representing hours of operation; and wherein the number of revolutions of the rotor shaft and/or the number of revolutions of the rotor shaft since a beginning of operation of the electric motor is determined from a count of a counter that counts zero crossings of a phase current or of motor current of the electric motor.

20. A method for operating a system that includes an electric motor having a terminal box into which a three-phase power cable is arranged and in which a stator winding and/or wire ends of a winding wire of the stator winding of the electric motor is electrically connected to electrical lines of the three-phase power cable, a data collector being arranged in the terminal box of the electric motor, including a data storer, and being electrically connected to at least one sensor arranged in and/or on the electric motor, the data collector including an electronic circuit adapted to modulate and demodulate voltage portions, comprising:

performing modulation and demodulation of the voltage portions in one or more first time periods; and supplying the electric motor with electrical power for generating mechanical torque in one or more second time periods;

wherein the first time period or periods do not overlap with the second time period or periods.

* * * * *